C. H. DRIVER.
METAL CUTTING MACHINE.
APPLICATION FILED JUNE 29, 1917.

1,282,394.

Patented Oct. 22, 1918.
3 SHEETS—SHEET 2.

Witness:

Inventor:
Charles H. Driver
By Geo. W. Young
Attorney

C. H. DRIVER.
METAL CUTTING MACHINE.
APPLICATION FILED JUNE 29, 1917.
1,282,394.
Patented Oct. 22, 1918.
3 SHEETS—SHEET 3.
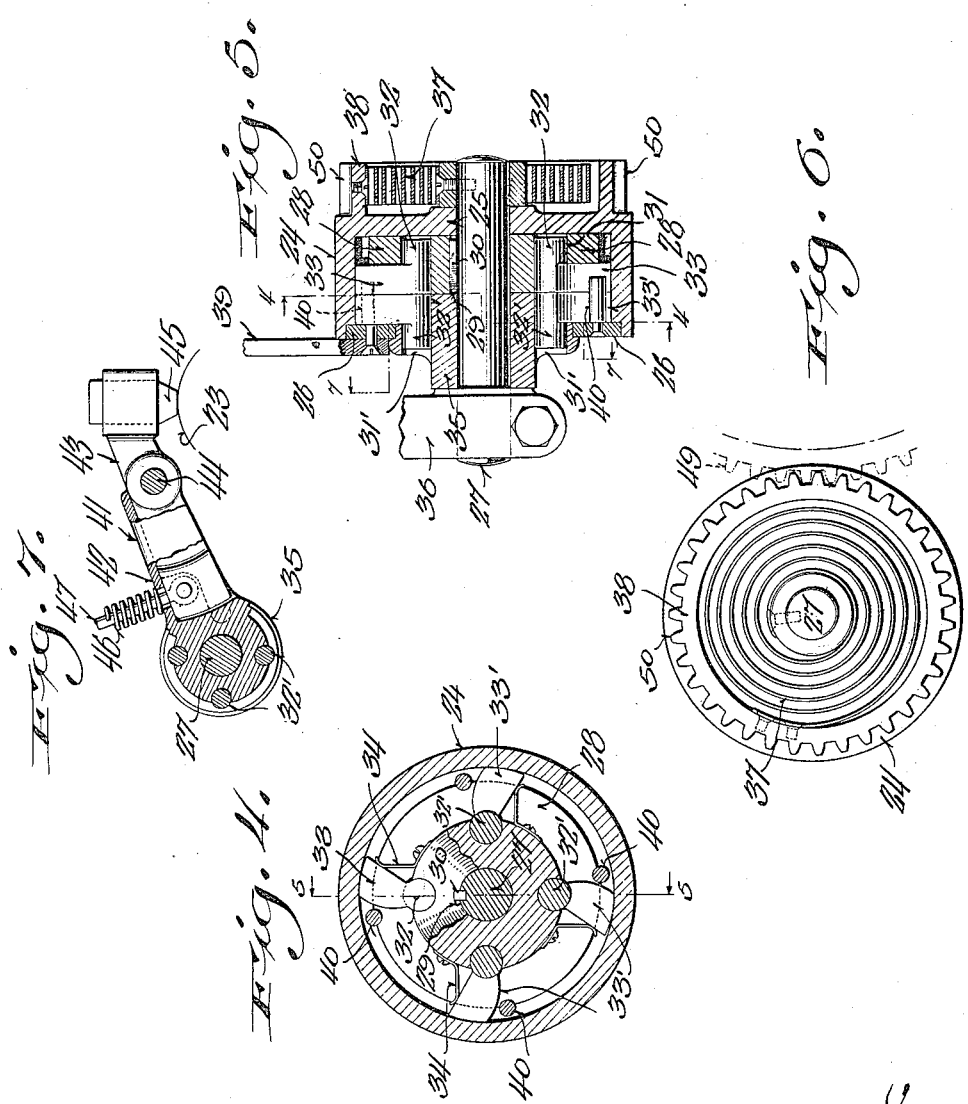

UNITED STATES PATENT OFFICE.

CHARLES H. DRIVER, OF RACINE, WISCONSIN, ASSIGNOR TO J. MOORES JONES, OF RACINE, WISCONSIN.

METAL-CUTTING MACHINE.

1,282,394.  Specification of Letters Patent.  Patented Oct. 22, 1918.

Application filed June 29, 1917. Serial No. 177,664.

*To all whom it may concern:*

Be it known that I, CHARLES H. DRIVER, a citizen of the United States, and resident of Racine, in the county of Racine and State of Wisconsin, have invented certain new and useful Improvements in Metal-Cutting Machines; and I do hereby declare that the following is a full, clear, and exact description thereof.

My invention relates to new and useful improvements in metallic cutting machines, particularly to that type known as power hack saws.

Inasmuch as it is extremely detrimental to the teeth of a saw to have the cutting edge dragged over the work which is being operated upon the non-cutting stroke of said saw, it is primarily an object of the present invention to provide means for raising the saw blade out of engagement with the work material immediately at the termination of the cutting stroke so that on the non-cutting stroke there will be no contact between the saw teeth and material which it is adapted to cut.

Still another object of this invention is to provide means for automatically feeding the saw blade to the work material and returning it from the raised position assumed during the non-cutting stroke into engagement with the work-material or stock.

In connection with the foregoing object it is secondarily an object of this invention to provide means for adjusting the amount of force with which the saw blade engages the stock during the cutting operation.

An additional object is to provide a simply constructed machine consisting of a relatively few number of parts which can be readily assembled or disassembled for the replacement of any worn parts or for any other reason.

With these and other objects in view the invention resides in the novel features of construction, combination and arrangement of parts which will be hereinafter more particularly described and claimed, and shown in the drawings, wherein:

Fig. 4 is an enlarged detail sectional view on the plane of the line 4—4 of Fig. 5.

Fig. 5 is a similar view on the line 5—5 of Fig. 4.

Fig. 6 is a detail side elevational view of the parts shown in Fig. 5, and

Fig. 7 is a sectional view taken substantially on the plane of the line 7—7 of Fig. 5.

In the accompanying drawings, my invention has been shown for use in connection with a metal cutting machine or hack saw, but it is obvious that the improved mechanism thereof could very well be used for permitting the return of any article or tool from one position to another without contacting with work material or other objects which it normally engages when moving in a reverse direction. The same is equally true of the means for feeding the article or tool toward the work material or other object preparatory to engagement of the same. Furthermore, several different arrangements might be employed for connecting the mechanism which performs the foregoing functions with a saw or other tool or machine, as will appear from Figs. 1 and 3.

Figure 1:
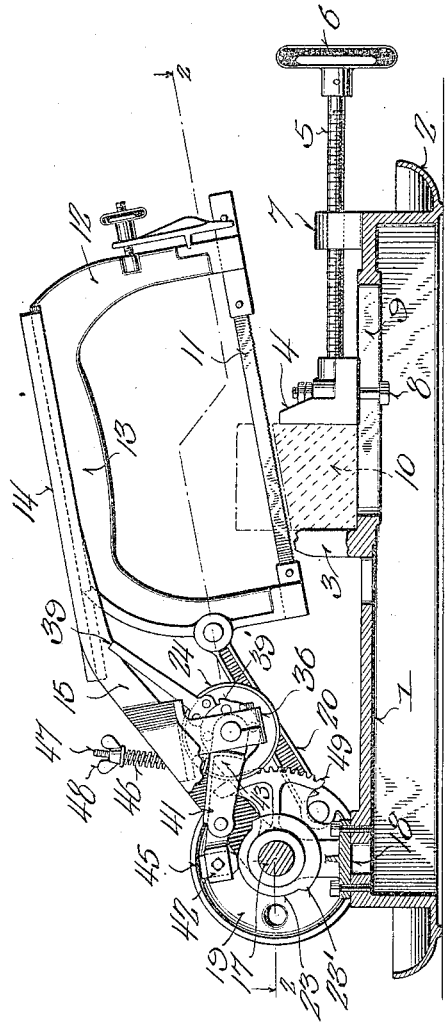
Figure 1 represents a substantially central vertical sectional view through a metal cutting machine constructed in accordance with my invention, said section being taken on the plane of the line 1—1 of Fig. 2.

Referring to the use of the invention in connection with a power hack saw, it will be seen that a saw of conventional design is used therewith, and the whole is mounted upon a suitable raised base 1 preferably of rectangular shape and having an outwardly extending upturned flange 2. On the base is mounted the stationary and movable jaws 3 and 4 respectively of a suitable work holding vise, said movable jaw being shifted toward and away from the stationary jaw by a feed screw 5 connected therewith. The outer end of the screw 5 is provided with a hand wheel 6 and the intermediate portions are threadedly engaged with a stationary nut 7 fixed to said base. The movable jaw 4 is guided during its movement by means of a depending slotted stud 8 which projects through a slot 9 in the top of said base. In Fig. 1 a block of stock 10 is shown disposed between the two jaws of the vise.

Figure 2:
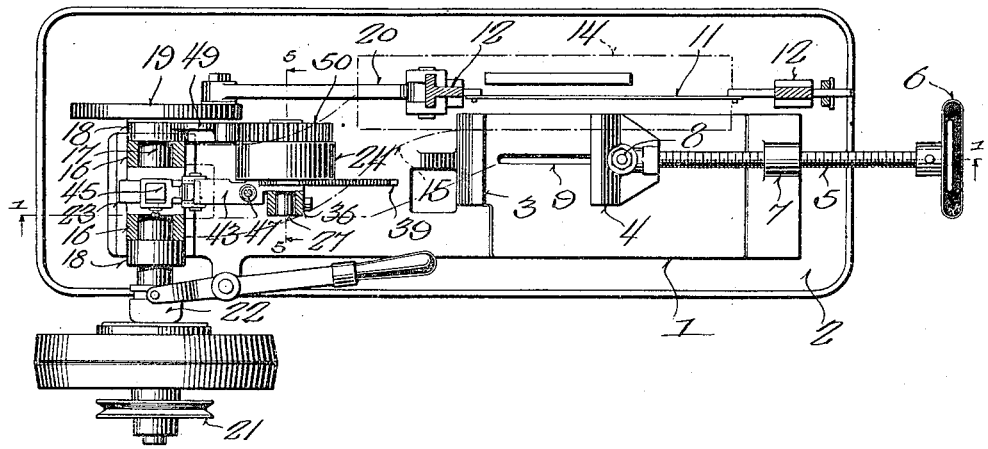
Fig. 2 is a horizontal sectional view taken substantially on the plane of the line 2—2 of Fig. 1.

For cutting the stock a suitable saw blade 11 is held between the lower ends of arms 12 of a saw frame 13 which is reciprocatorily mounted in a saw guide 14. Projecting from the guide 14 is an arm 15 whose free end is provided with a pair of spaced bearing sleeves 16 by means of which the saw guide is pivotally mounted upon a drive shaft 17. The latter part is preferably journaled in brackets 18 bolted to the top of the base 1 adjacent one end thereof, preferably that end remote from the work holding vise. As shown by the dot-and-dash lines in Fig. 2 the saw guide 14 is disposed longitudinally of the base 1 and to one side thereof while the arm 15 is somewhat offset for engagement with said drive shaft. By such an arrangement the saw blade 11 may be readily moved into or out of engagement with the stock by rocking the saw guide upon the shaft.

Means for reciprocating said saw frame with the saw 11 consists of a crank plate 19 fixed to one end of said shaft, and a pitman 20 connected to the crank plate and one arm of the saw frame, as shown in Fig. 1. The shaft 17 also carries a pulley 21 by which power may be transmitted thereto, and also connected with the shaft is a clutch 22 for controlling operation of the same.

The foregoing described parts will cause the reciprocation of the saw frame to permit the saw carried thereby to cut the piece of stock 10, but during the non-cutting stroke of said saw, the teeth thereof will be dragged over the work material. It is obvious that such an arrangement will have a more harmful effect upon the saw teeth than the cutting engagement of the saw and the stock 10. To provide against this disadvantage, machines constructed in accordance with the present invention may be provided with means for raising the saw blade out of engagement with work material on the return stroke. This means includes a cam disk 23 carried by the shaft 17 preferably intermediate its ends, a combined feeding and elevating mechanism and an operative connection between the latter and the cam disk.

The combined feeding and elevating mechanism comprises a cylindrical casing 24 having one end closed by a wall 25 and the other end by a circular plate 26, which is separate therefrom and movable independently thereof, and a shaft 27 which extends through an opening in the wall 25 and through an enlarged opening in the plate 26. In the back of the casing adjacent the wall 25 is disposed a circular plate 28, of somewhat smaller diameter than the inner diameter of the casing, which circular plate is loosely keyed to the shaft 27. In other words, the key-way 29 therein is wider than the key 30. This permits a slight slippage between the plate 28 and the shaft. At diametrically opposite points in the plate 28 are formed transverse openings 31 which receive the cylindrical shanks 32 of locking dogs or cams 33. These dogs are of sufficient length to frictionally engage the inner surfaces of the casing and are urged into contact therewith by means of leaf springs 34 carried by a collar portion of the plate 28. Inasmuch as the casing is loose on the shaft 27 it will be seen that it may be readily revolved in one direction on said shaft, but held against turning in the opposite direction thereon because of the cam action of the dogs 33.

The casing also contains a second set of dogs 33' which are urged in the same direction by springs similar to the springs 34, said dogs 33' being similar in all respects to the other dogs, they having cylindrical transversely extending shanks 32' for rotative disposition in apertures 31' of a plate 35 which is loosely mounted on the shaft 27. This plate 35 is of a diameter similar to the opening in the plate 26 and is adapted to rotate independently of said plate. The shaft 27 is held against rotation in a depending arm 36 carried by the arm 15, and it will thus be seen that upon rotation of the plate 35 in a clockwise direction the casing 24 will be caused to rotate in the same direction because of the engagement of dogs 33' with the inner wall of said casing. Although the casing could readily be rotated in the opposite direction on the reverse movement of the plate 35 if the dogs 33 were not used because of the freedom of movement of the plate 35 on the shaft 27, it is obvious that said dogs 33 will operate to prevent this as they are indirectly connected to the said relatively stationary shaft 27.

Figure 3:
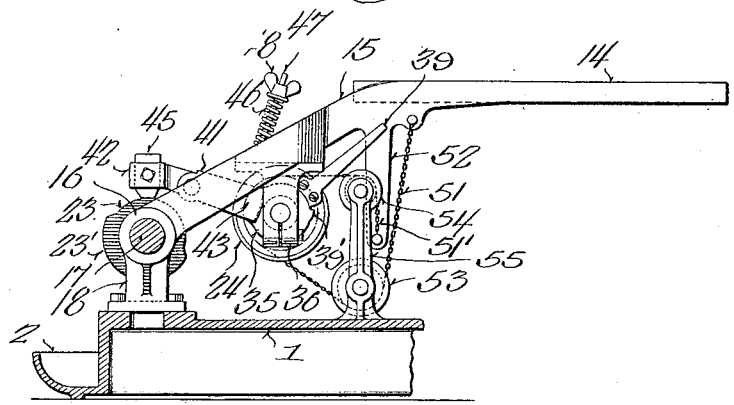
Fig. 3 is a detail vertical longitudinal sectional view showing a slight modification of the construction illustrated in Figs. 1 and 2.

However, the casing 24 may be returned a fraction of the distance which it was initially moved by the dogs 33' and the plate 35, said initial direction of movement in Figs. 1 and 3 being clockwise, because of the slippage between the plate 28 and the shaft 27 due to the enlarged key-way 29. The movement of the casing in this reverse or counter-clockwise direction is caused by the coil or clock spring 37 disposed within a supplemental casing formed by the wall 25 of the casing 24 and an annular flange 38 which projects therefrom, one end of said spring being fixed to said flange and the other end connected to the shaft 27.

The two sets of dogs 33 and 33' are thrown out of operation simultaneously by the rotation of the plate 26 in a clockwise direction, this movement being imparted thereto by a lever or handle 39. The connection between the plate 26 and both sets of locking dogs 33 and 33' is provided by a plurality of diametrically opposed pins 40 which project laterally from the inner face of the plate, as shown in Figs. 4 and 5. The excessive movement of the lever and the plate 26 with respect to the plate 35 and the dogs is prevented by the stop 39' on the last mentioned plate.

The plate 35 is caused to rotate as above set forth by means of the rotation of the cam disk 23 with which it is connected by a compensating lever 41, said lever consisting of two parts 42 and 43, the latter part being pivoted intermediate its ends to the outer end of the first mentioned part by a pin 44. The portion 42 of this lever is substantially inverted U-shaped in transverse cross section and is adapted to house that portion of the part 43 between its fulcrum and its inner end, as shown in Fig. 7. The outer or free end of the part 43 carries a contact block 45 which continually engages the cam disk 23.

This arrangement of the parts of the compensating lever permits one part to move with respect to the other. The facility with which this movement of the parts of the lever takes place is regulated by the expansion helical spring 46, which is disposed on a spring rod 47 pivoted to the part 43 of the lever adjacent its inner end. The tension of the spring 46 is readily adjusted by means of a nut 48 threaded on the outer end of the spring rod. By thus adjusting the tension of the spring the force with which the saw 11 engages the work material is regulated, which will be hereinafter more particularly referred to.

As clearly shown in Figs. 1 and 3, substantially one half of the periphery of the cam disk 23 is disposed outwardly of the other half, as will be seen at 23'. Since the contact block 45 is continuously in engagement with the periphery of the cam disk 23, it will be seen that upon each rotation of the latter the lever 41 will rise and fall a predetermined amount, it being caused to rise by the portion 23' of the disk and allowed to fall when the other portion of the disk is engaged. This movement of the lever will actuate the plate 35 since the part 42 of said lever is formed integrally therewith. Therefore, it will be obvious that upon each upward movement of the lever, the casing 24 will be rotated a short distance in a clockwise direction, and upon each downward movement of the lever the casing will move in a reverse direction a small amount due to the loose connection between the plate 28 and the shaft 27. The amount of rotation of the casing in a counter-clockwise direction always remains substantially constant, as does the amount of movement in a clockwise direction, but the distance traveled by the casing during movement in a clockwise direction is greater than that of the reverse movement in order that the saw blade 11 may be progressively fed to the work material as it cuts into the same.

In order to apply the movement of these parts to a metal cutting or hack saw machine, either one of the connections shown in Figs. 1 and 3 may be utilized, that shown in Fig. 1, consisting of a rack and gear, and that in Fig. 3 being an arrangement of pulleys and chains. When the first mentioned arrangement is used, a gear sector or rack 49 is secured to one of the brackets 18 in position to have its teeth engaged by teeth 50 formed on the flange 38 of the casing 24. It will now be seen that as the casing 24 is rotated in clockwise direction, it is also moved downwardly because of its engagement with the sector 49 to carry with it the saw guide and saw frame including the saw 11.

When the chain and pulley arrangement shown in Fig. 3 is used instead of a gear and rack the same result is accomplished and in the same manner except that the chain 51 which is connected to the flange 38 of the casing and to the saw guide 14 tends to shorten upon rotation of the casing in a clockwise direction to pull the saw guide downwardly. Another portion 51' of said chain which is also connected to the casing flange 38 and to an arm 52 of the saw guide, causes the elevation of the saw guide and the parts carried thereby when said casing is rotated in a counterclockwise direction. The portion 51 of the chain is trained around a pulley 53 while the portion 51' is disposed around a pulley 54, both of which are journaled in a standard 55 carried by the base 1.

The operation of my invention in relation to a power hack saw may be briefly described as follows: Assuming the several parts have been assembled as shown in Fig. 1 with the cam 23 arranged so that the ends of its raised portion will be engaged by the contact block 45 of the lever 41 at the ends of the strokes of the saw, said saw will be successively fed to the piece of stock 10 and held in engagement therewith during the cutting strokes and lifted slightly out of contact therewith on the non-cutting strokes. Both of these movements, that is to say the feeding of the saw to the work and lifting of the same out of engagement with the stock, are obviously accomplished by the rotation of the casing 24 in different directions. The casing 24 is rotated in a clockwise direction to feed the saw toward the work by the rocking of the lever 41, such rocking being due to the raised portion 23' of the cam 23, and the consequent rotation of the plate 35, the dogs 33' mounted on said plate being thrown into engagement with the casing when the same is moved in a clockwise direction. This rotative movement of the plate 35 tends to dispose the dogs 33' radially, they being normally positioned otherwise.

With the arrangement illustrated in Fig. 1, rotation of the casing 24 in a clockwise direction will obviously cause the parts carrying the saw blade 11 to move downwardly owing to the geared connection between said casing and the fixed rack 49. The amount of movement of the saw blade toward the work may be varied by changing the height of the raised portion 23′ with the cam 23, as such raised portion rocks the lever 41. The pressure with which the saw blade engages the work is regulated by the tension of the spring 46 as hereinbefore particularly set forth, said spring being used to vary amount of movement between the two parts 42 and 43 of said lever.

The dogs 33 act to hold the casing 24 against movement in counter-clockwise direction inasmuch as the plate 28 to which they are pivoted is keyed to the relatively stationary shaft 27. It is advisable, however, to permit a slight counter-clockwise movement of the casing to allow the saw blade to move out of contact with the work upon its return or non-cutting stroke. This is effected in a very simple manner by enlarging the key-way 29 of the key which connects the plate 28 with the shaft 27 and providing the spring 37. This raising movement of the parts carrying the saw blade need only be very slight, but may be regulated or varied by increasing or decreasing the width of the key-way 29. The counter-clockwise direction of the casing 24 is, however, always less than the clockwise movement thereof inasmuch as it is necessary to progressively feed the saw blade toward the work material.

When the saw blade has completed its cut, the parts supporting the same may be elevated to permit the insertion of a fresh piece of stock by releasing simultaneously both sets of dogs. This is accomplished by moving the handle 39 downwardly to thus rotate the plate 26 in a clockwise direction and move the pins 40 into engagement with the dogs 33 and 33′. When this handle is released the springs 34 again move the dogs into operative position.

From the foregoing description, it is evident that the movement of the parts which form the major portion of my invention can readily be adapted for use on machines other than metal cutting or hack saw machines, simply by changing the means for attaching the same to such machine. Furthermore, it will be seen that such movements will function very effectively regardless of the manner in which they are connected to parts to be operated thereby. Various changes may be made in the form and proportion and the minor details of construction of these parts without departing from or sacrificing any of the principles of the invention, as set forth in the appended claims.

I claim:—

1. In a device of the class described, an operating member adapted to engage work material, means for urging the member toward the work material upon movement thereof in one direction, and means for regulating the force for urging the member toward the work material, said means including a two-part lever, the parts being pivoted together, and a spring connected with one part and bearing against the other.

2. In a device of the class described, an operating member adapted to engage work material, means for actuating the member, means for feeding the member toward the work material including a rotative member, a lever, means for rocking the lever, means carried by the lever to engage the rotative member when the former is rocked in one direction whereby to move the rotative member in the same direction, and a connection between the rotative member and the operating member to move the latter toward the work material when the former is revolved in one direction.

3. In a device of the class described, an operating member adapted to engage work material, means for actuating the member, means for feeding the member toward the work material including a rotative member, a two part lever, the parts being pivoted together, adjustable means connected with the two parts of the lever to limit the movement of one part relative to the other, means engageable with the lever to rock the same, means carried by the lever to engage the rotative member when the former is rocked in one direction whereby to revolve the rotative member in one direction, and a connection between the rotative member and the operating member to move the latter toward the work material when the former is revolved in one direction.

4. In a device of the class described, an operating member adapted to engage work material, means for actuating the member, means for feeding the member toward the work material including a rotative member, a two part lever, the parts being pivoted together, a spring rod extending from one part and projecting through the other part, an expansion spring on said rod and engaging the last mentioned part of the lever, an adjustable stop on the rod in contact with said spring, means engageable with the lever to rock the same, means carried by the lever to engage the rotative member when the former is rocked in one direction whereby to revolve the latter in the same direction, and a connection between the rotative member and the operating member to move the latter toward the work material when the former is revolved in one direction.

5. In a device of the class described, an operating member adapted to engage work material, means for actuating the member, means for feeding the member toward the work material including a rotative member, a plate movable independently of the rotative member, means carried by the plate for engagement with the rotative member when said plate is moved in one direction, means for actuating the plate, and means connected with the rotative member and the operating member whereby revolution of the former will move the latter toward the work material.

6. In a device of the class described, an operating member adapted to engage work material, means for actuating the member, means for feeding the member toward the work material including a rotative member, a plate moved independently of the rotative member, means carried by the plate for engagement with the rotative member when said plate is moved in one direction, a continuously rotative shaft, a cam disk fixed on said shaft, one portion having its periphery extending outwardly of the other, a lever fixed to the plate and engageable with the periphery of said cam disk, and means connected with said rotative member whereby revolution of the latter will move the operating member toward the work material 7. In a device of the class described, an operating member adapted to engage work material, means for operating the member, and means for feeding the member toward the work material including a casing, a plate movable independently of the casing, a dog carried by the plate for engagement with the casing when said plate is moved in one direction, means for actuating the plate, and means connected with the casing, whereby rotation of the latter will move the operating member toward the work material.

8. In a device of the class described, an operating member adapted to engage work material, means for operating the member, and means for feeding the member toward the work material including a casing, a plate movable independently of the casing, a dog carried by the plate for engagement with the casing when said plate is moved in one direction, a lever fixed to the plate, a cam engaging said lever for rocking the same to actuate the plate, and means connected with the casing whereby rotation of the latter will move the operating member toward the work material.

9. In a device of the class described, an operating member adapted to engage work material, means for operating the member, and means for feeding the member toward the work material including a casing, a plate movable independently of the casing, a dog carried by the plate for engagement with the casing when said plate is moved in one direction, means for actuating the plate, a continuously rotating shaft, a cam disk fixed on said shaft, one portion having its periphery extending outwardly of the other, a lever fixed to the plate and engageable with the periphery of said cam disk, and means connected with the casing whereby rotation of the latter will move the operating member toward the work material.

10. In a device of the class described, an operating member adapted to engage work material, means for operating the member, and means for feeding the member toward the work material including a casing, a plate movable independently of the casing, a dog carried by the plate for engagement with the casing when said plate is moved in one direction, a two-part lever, the parts being pivoted together, one part being fixed to the plate, a cam adapted to be engaged by the other part of the lever, means for regulating the force necessary to move one part of the lever with respect to the other, and means connected with the casing whereby rotation of the latter will move the operating member toward the work material.

11. In a device of the class described, an operating member adapted to engage work material, means for actuating the member, and means for feeding the member toward the work material including a casing, a plate movable independently of the casing, a dog carried by the plate for engagement with the casing when said plate is moved in one direction, a two-part lever, the parts being pivoted together, one part being fixed to the plate, a cam adapted to be engaged by the other part of the lever, a spring rod connected with one part of the lever and extending through the other, an expansion spring on the rod, an adjustable stop on one end of the rod to confine the spring between the same and the last mentioned part of the lever, and means connected with the casing whereby rotation of the latter will move the operating member toward the work material.

12. In a device of the class described, an operating member adapted to engage work material, means for actuating the member, a rotative member, means for revolving the rotative member in one direction, means for revolving the rotative member in the reverse direction, and means connected with the rotative member whereby movement of the operating member toward or away from the work material is controlled by the direction and amount of rotation of the rotative member.

13. In a device of the class described, an operating member adapted to engage work material, means for actuating the member, a rotative member, means for revolving the rotative member a predetermined extent in one direction, means for revolving the rotative member a less extent in the reverse direction, and means connected with the rotative member whereby movement of the operating member toward or away from the work material is controlled by the direction and amount of rotation of the rotative member.

14. In a device of the class described, an operating member adapted to engage work material, means for actuating the member, a rotative member, a plate movable independently of the rotative member, means carried by the plate for engagement with the rotative member when said plate is moved in one direction whereby to revolve the rotative member in the same direction, means for actuating the plate to revolve the rotative member, means for urging the rotative member in a direction reverse to the direction of movement imparted by the plate, and means connected with the rotative member whereby movement of the operating member toward or away from the work material is controlled by the direction and amount of rotation of the rotative member.

15. In a device of the class described, an operating member adapted to engage work material, means for actuating the same, a relatively stationary shaft, a rotative member disposed on the shaft, a plate movable independently of the rotative member and shaft, means carried by the plate for engagement with the rotative member when the former is moved in one direction whereby to revolve the latter in the same direction, a lever connected with the plate for rocking said lever, means for urging the rotative member in a direction reverse to the direction of movement imparted by the plate, and means connected with the rotative member whereby movement of the operating member toward or away from the work material is controlled by the direction and amount of rotation of the rotative member.

16. In a device of the class described, an operating member adapted to engage work material, means for actuating the member, a relatively stationary shaft, a casing disposed on said shaft, a plate on said shaft movable independently of the casing and shaft, a dog carried by the plate for engagement with the casing when said plate is moved in one direction whereby to revolve the casing in the same direction, means for actuating the plate to revolve the casing, a loose connection between the casing and shaft, means for urging the casing in a direction reverse to the direction of movement imparted by the plate, and means connected with the casing whereby movement of the operating member toward or away from the work material is controlled by the direction and amount of rotation of said casing.

17. In a device of the class described, an operating member adapted to engage work material, a relatively stationary shaft, a casing loosely mounted on said shaft, said casing having a limited rotative movement, a spring connected with the casing and shaft whereby to urge the rotation of the casing in one direction, a plate disposed on the shaft, a dog carried by the plate for engagement with the casing when said plate is moved in one direction, means for actuating the plate to revolve the casing in a direction opposite the direction of movement imparted by said spring, and means connected with the casing whereby movement of the operating member toward or away from the work material is controlled by the direction and amount of rotation of said casing.

18. In a device of the class described, an operating member adapted to engage work material, means for actuating said member, and means for moving said member toward or away from said work material, said means including a relatively stationary shaft, a casing surrounding said shaft, a plate disposed on said shaft within the casing, said plate being loosely keyed to the shaft, a second plate disposed on the shaft within the casing, said second plate being free to move on said shaft, a set of dogs carried by each of said plates, means for moving the second plate to cause rotation of said casing in one direction, a spring connected with the casing and shaft to urge the former in a reverse direction, the dogs on the first mentioned plate preventing excessive rotation of the casing by said spring, and means connected with the casing whereby movement of the operating member toward and away from the work material is controlled by the direction and amount of rotation of said casing.

19. In a device of the class described, an operating member adapted to engage work material, means for actuating said member, and means for moving said member toward or away from said work material, said means including a relatively stationary shaft, a casing surrounding said shaft, a plate disposed on said shaft within the casing, said plate being loosely keyed to the shaft, a second plate disposed on the shaft within the casing, said second plate being free to move on said shaft, a set of dogs carried by each of said plates, means for moving the second plate to cause rotation of said casing in one direction, a spring connected with the casing and shaft to urge the former in a reverse direction, the dogs on the first mentioned plate preventing excessive rotation of the casing by said spring, means connected with the casing whereby movement of the operating member toward and away from the work material is controlled by the direction and amount of rotation of said casing, and means for simultaneously disengaging said sets of dogs from the casing to permit the same to freely move on said shaft.

20. In a device of the class described, an operating member adapted to engage work material, means for actuating said member, and means for moving said member toward or away from said work material, said means including a relatively stationary shaft, a casing surrounding said shaft, a plate disposed on said shaft within the casing, said plate being loosely keyed to the shaft, a second plate disposed on the shaft within the casing, said second plate being free to move on said shaft, a set of dogs carried by each of said plates, means for moving the second plate to cause rotation of said casing in one direction, a spring connected with the casing and shaft to urge the former in a reverse direction, the dogs on the first mentioned plate preventing excessive rotation of the casing by said spring, an annular series of gear teeth carried by the casing, and a stationary rack engaged by said series of gear teeth whereby the operating member is moved toward or away from the work material.

21. In a device of the class described, a relatively fixed shaft, a rotative member loosely disposed on said shaft, a plate on said shaft and movable independently of the same and the member, a dog carried by the plate to engage the member when said plate is moved in one direction, whereby to rotate said member in the same direction, a second plate keyed to the shaft, a dog carried by the second plate to engage the member to prevent excessive movement thereof in a direction reverse to the direction of movement imparted by the first plate, and means for actuating the first plate.

22. In a device of the class described, a relatively fixed shaft, a rotative member loosely disposed on said shaft, a plate on said shaft and movable independently of the same and the member, a dog carried by the plate to engage the member when said plate is moved in one direction, whereby to rotate said member in the same direction, a second plate keyed to the shaft, a dog carried by the second plate to engage the member to prevent excessive movement thereof in a direction reverse to the direction of movement imparted by the first plate, a third plate movable independently of the other plates and member, pins on the third plate for engaging and simultaneously moving the dogs out of contact with the member to permit the same to freely rotate on said shaft, and means for actuating the first plate.

In testimony that I claim the foregoing I have hereunto set my hand at Racine, in the county of Racine and State of Wisconsin.

CHARLES H. DRIVER.

Copies of this patent may be obtained for five cents each, by addressing the "Commissioner of Patents, Washington, D. C."